(12) United States Patent
Murphy

(10) Patent No.: US 6,390,571 B1
(45) Date of Patent: May 21, 2002

(54) REDUNDANT AIRCRAFT BRAKING SYSTEM ARCHITECTURE

(75) Inventor: John T. Murphy, Middlebury, VT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/606,618

(22) Filed: Jun. 29, 2000

(51) Int. Cl.⁷ ............... B60T 11/18; B60T 11/21; B60T 13/66
(52) U.S. Cl. ............ 303/126; 303/14; 303/20; 303/13; 303/15; 303/122; 244/111
(58) Field of Search ............... 303/126, 13, 2, 303/3, 15, 14, 20, 199, 9.61, 122.03, 155, 9.63, 18, 122; 244/111; 701/78, 79, 70; 188/106 P

(56) References Cited

U.S. PATENT DOCUMENTS

| | | |
|---|---|---|
| 3,926,479 A | 12/1975 | Bissell et al. |
| 4,493,210 A | 1/1985 | Fries et al. |
| 4,784,442 A | 11/1988 | Petersen |
| 5,044,697 A * | 9/1991 | Longyear et al. ........... 303/126 |
| 5,170,343 A | 12/1992 | Matsuda |
| 5,397,173 A | 3/1995 | Bourguet |
| 5,472,264 A | 12/1995 | Klein et al. |
| 5,754,021 A | 5/1998 | Kojima |
| 5,952,799 A | 9/1999 | Maisch et al. |
| 5,954,407 A | 9/1999 | Schramm et al. |
| 5,961,190 A | 10/1999 | Brandmeier et al. |
| 6,038,500 A | 3/2000 | Weiss |
| 6,081,081 A | 6/2000 | Maisch |
| 6,193,326 B1 * | 2/2001 | Ybert ........................ 303/126 |
| 6,296,325 B1 * | 10/2001 | Corio et al. .................. 303/20 |

FOREIGN PATENT DOCUMENTS

| | | |
|---|---|---|
| DE | 4227157 | 8/1992 |
| EP | 0229559 | 12/1986 |
| EP | 0499515 | 2/1992 |

OTHER PUBLICATIONS

International Search Report dated Oct. 24, 2000 for International Application No. PCT/US0019213.
US Patent Application No. 09/357,341 filed Jul. 14, 1999.
US Patent Application No. 09/354,456 filed Jul. 15, 1999.

* cited by examiner

Primary Examiner—Douglas C. Butler
(74) Attorney, Agent, or Firm—Renner, Otto, Boisselle & Sklar, LLP

(57) ABSTRACT

A redundant brake control and anti-skid system is described for providing braking to a vehicle. The system includes a primary brake control assembly for performing brake control and anti-skid functions, and a secondary brake control assembly for performing brake control and anti-skid functions. A bus is provided for enabling communications between the primary brake control assembly and the secondary brake control assembly. At least one brake actuator controlled by the primary brake control assembly and at least one other brake actuator controlled by the secondary brake control assembly are included for providing braking force to wheels of the vehicle.

13 Claims, 5 Drawing Sheets

US 6,390,571 B1

REDUNDANT AIRCRAFT BRAKING SYSTEM ARCHITECTURE

TECHNICAL FIELD

The present invention relates generally to brake systems for vehicles, and more particularly to a braking system for use in aircraft.

BACKGROUND OF THE INVENTION

Various types of braking systems are known. For example, hydraulic, pneumatic and electromechanical braking systems have been developed for different applications.

An aircraft presents a unique set of operational and safety issues. For example, uncommanded braking due to failure can be catastrophic to an aircraft during takeoff. On the other hand, it is similarly necessary to have virtually fail-proof braking available when needed (e.g., during landing). Moreover, it is important that braking be effected promptly and reliably.

In view of shortcomings associated with conventional braking systems, there is a strong need in the art for a braking system which may be employed reliably on a vehicle such as an aircraft.

SUMMARY OF THE INVENTION

A hydraulic braking system utilizes redundancy features to provide safe and reliable braking. The braking system is configured to operate on pressure provided by multiple pressure supplies and based on multiple control sources. System redundancy allows for failure in one or more primary components without total loss of braking capacity.

According to one aspect of the invention a redundant brake control and anti-skid system is described for providing braking to a vehicle. The system includes a primary brake control assembly for performing brake control and anti-skid functions, and a secondary brake control assembly for performing brake control and anti-skid functions. A bus is provided for enabling communications between the primary brake control assembly and the secondary brake control assembly. At least one brake actuator controlled by the primary brake control assembly and at least one other brake actuator controlled by the secondary brake control assembly are included for providing braking force to wheels of the vehicle.

According to another aspect of the invention, a redundant brake control and anti-skid system is described for providing braking to a vehicle. The system includes a primary brake control assembly having a primary wheel control circuit for performing brake control and anti-skid functions, and a primary interface control circuit for interfacing with the vehicle and providing emergency shutoff function. In addition, the system includes a secondary brake control assembly having a secondary wheel control circuit for performing brake control and anti-skid functions, and a secondary interface control circuit for interfacing with the vehicle and providing emergency shutoff function. The system includes a bus for enabling communications between the primary brake control assembly and the secondary brake control assembly. Moreover, the system includes at least one brake actuator controlled by the primary brake control assembly and at least one other brake actuator controlled by the secondary brake control assembly for providing braking force to wheels of the vehicle.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the drawings, wherein like reference labels are used to refer to like elements throughout.

Figure 1:
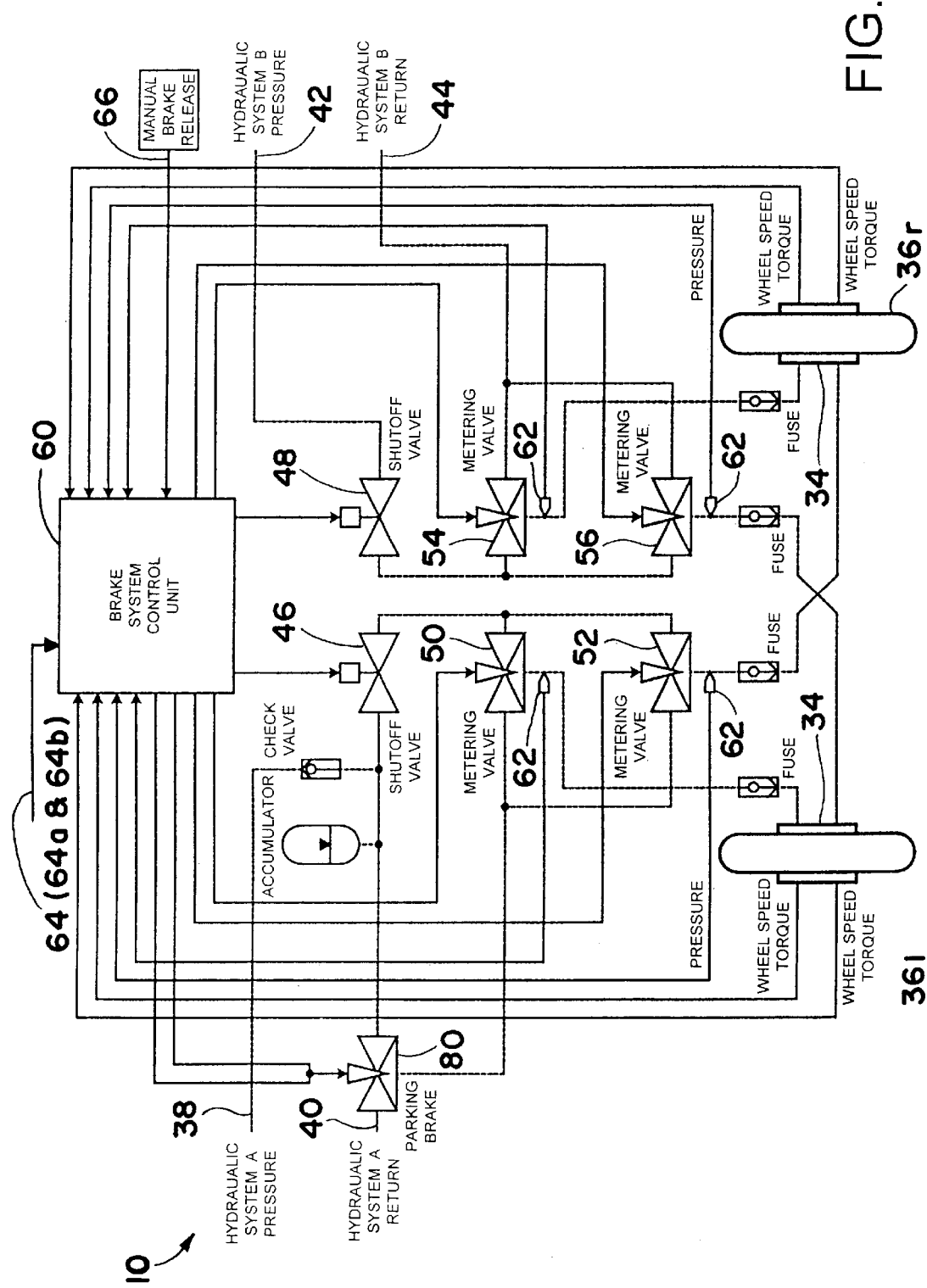
FIG. 1 is a block diagram of a redundant brake control and anti-skid system according to a first embodiment of the invention.

Referring initially to FIG. 1, a redundant brake control and anti-skid system 10 is shown for an aircraft in accordance with one embodiment of the present invention. The system 10 operates based on power provided from a plurality of hydraulic pressure supply sources. The system 10 has built in redundancy which allows the system 10 to continue to operate satisfactorily even in the case of failure of one or more system components as will be described in more detail below.

In the exemplary embodiment, the system primary components include hydraulic brakes 34 for applying braking force to the wheels. The aircraft in the present embodiment includes a wheel 36*l* mounted to a landing gear under the left wing of the aircraft, and a wheel 36*r* mounted to a landing gear under the right wing of the aircraft. Each wheel 36*l* and 36*r* includes two or more brake actuators for providing braking action thereto.

The system 10 further includes a hydraulic system A having a pressure supply 38 and return 40, and a hydraulic system B including a pressure supply 42 and return 44. The hydraulic brake systems A and B are enabled by shutoff valves 46 and 48, respectively, and are operated by dual metering valves 50,52 and 54,56, respectively. The metering valves 50, 52, 54 and 56 each provide controlled hydraulic activation of a corresponding brake actuator within the brakes 34 as is conventional.

The system 10 further includes a brake system control unit (BSCU) 60 which, as is described in more detail below, includes dual electronic brake control assemblies which control the hydraulic systems A and B. The BSCU 60 receives as inputs wheel speed, braking torque and temperature from respective primary and secondary sensors included in each brake 34. In addition, the BSCU 60 receives pressure signals from pressure sensors 62 respectively indicative of the pressure provided to each of the brake actuators in the brakes 34.

The BSCU 60 also receives brake command signals 64 from a pair of left and right brake pedal transducers (not shown) included in the cockpit of the aircraft. The transducers provide brake command signals 64 to the BSCU 60 which indicate pedal position and are proportional to the desired amount of braking. In addition, the BSCU 60 receives as an input a manual brake release signal 66 from the cockpit. The BSCU 60 also may receive discrete inputs from the aircraft electronics within the cockpit (e.g., aircraft speed, etc.), denoted as 67 in FIG. 2.

Figure 2:
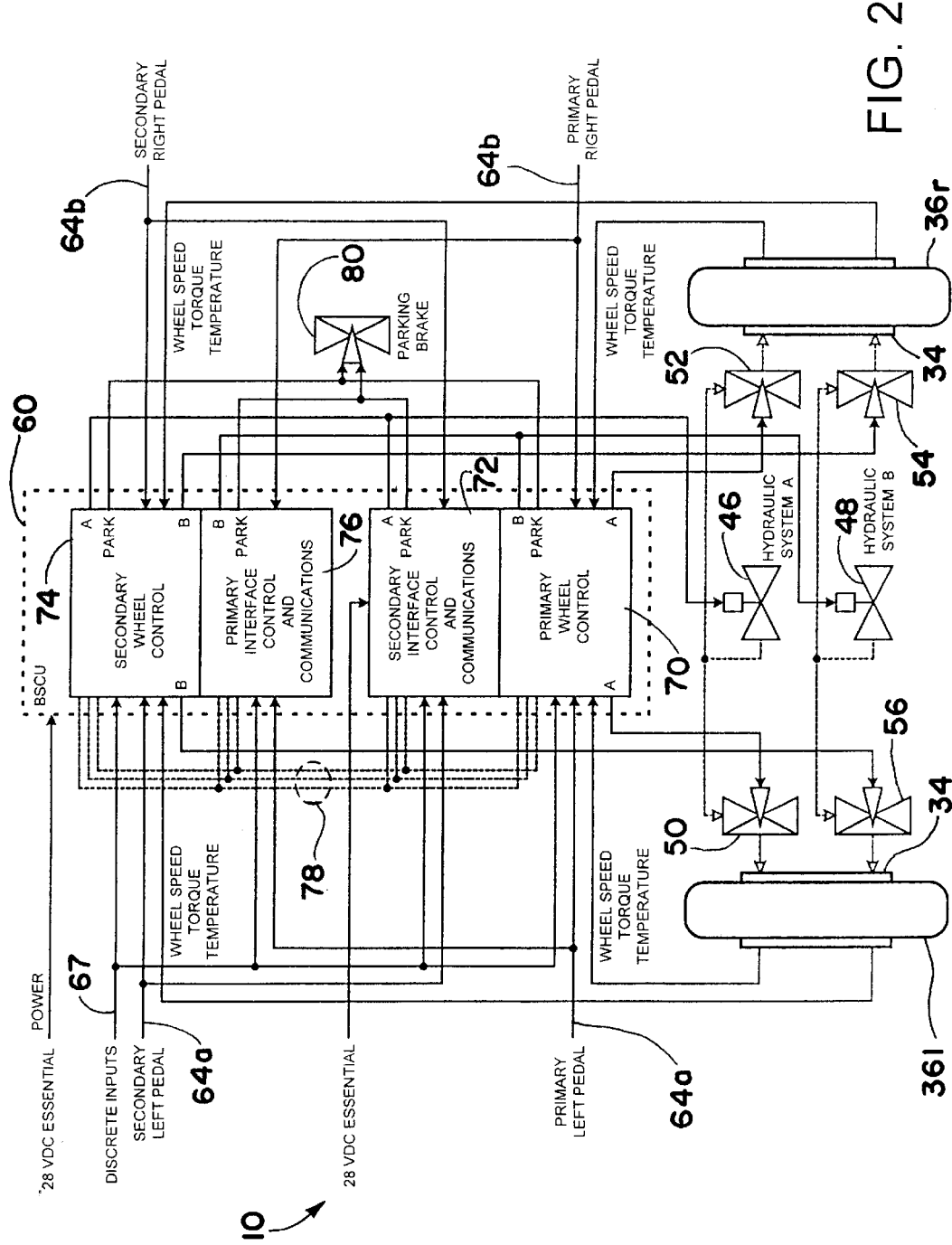
FIG. 2 is a more detailed block diagram of the system of FIG. 1.

FIG. 2 represents the system 10 of FIG. 1, and shows the electrical subassemblies included in the BSCU 60 and details the electrical to hydraulic connections. For ease of illustration, the hydraulic supply and returns are omitted in FIG. 2.

The BSCU 60 includes a primary wheel control circuit 70 and a secondary interface control circuit 72 configured together on a first circuit card assembly. In addition, the BSCU 60 includes a secondary wheel control circuit 74 and a primary interface control circuit 76 configured together on a second circuit card assembly. The primary wheel control circuit 70 and secondary wheel control circuit 74 are designed to provide brake control and anti-skid functions. The primary interface control circuit 76 and secondary interface control circuit 72 are designed to provide for aircraft interface management and shutoff valve operation.

i. Normal Operation

Figure 3:
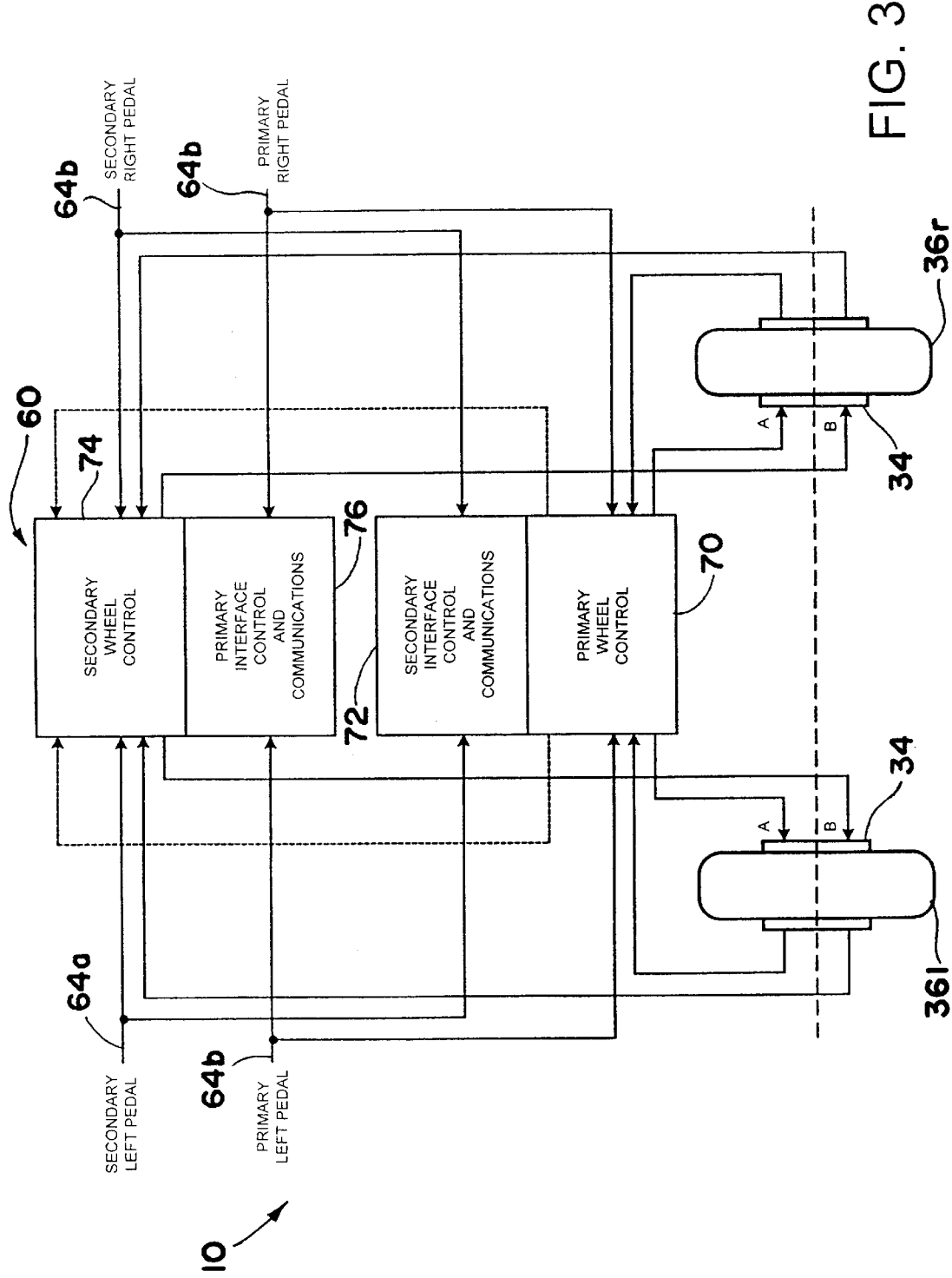
FIG. 3 represents signal flow within the system of FIGS. 1 and 2 during normal operation.
Figure 4:
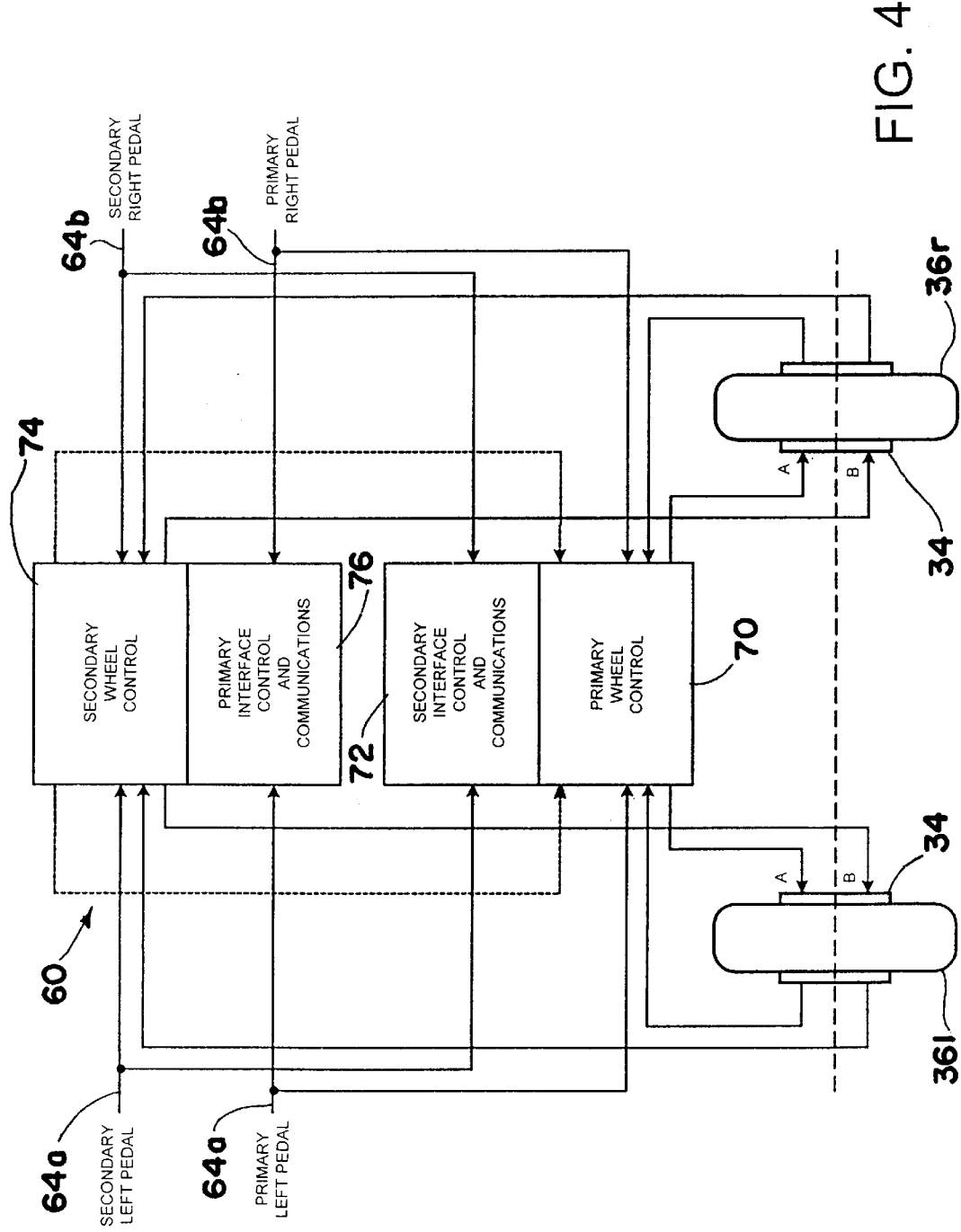
FIG. 4 represents signal flow within the system of FIGS. 1 and 2 in the event of a failed input.

During normal operation, i.e., no failures within the system, brake control and antiskid functions are performed by the primary wheel control circuit 70. Specifically, the primary wheel control circuit 70 collects wheel speed, torque, pressure and brake pedal position from the aforementioned sensors and inputs included in the system 10. The primary wheel control circuit 70 performs any suitable anti-skid algorithm, executes torque loop control, computes the brake pressure to be applied, and controls the hydraulic system A metering valves 50 and 52 to provide braking to the wheels 36*l* and 36*r*, respectively. The primary wheel control circuit 70 at the same time sends a message to the secondary wheel control circuit 74 via a common bus 78 indicating the brake pressure to be applied. Based on the information provided by the primary wheel control circuit 70, the secondary wheel control circuit 74 controls the hydraulic system B metering valves 54 and 56 to provide braking to the wheels 36*l* and 36*r*, respectively. FIG. 3 illustrates the basic signal flow between the respective components.

ii. Shutoff Valve Operation

Referring again to FIG. 2, the primary interface control circuit 76 and the secondary interface control circuit 72 both receive wheel speed information, brake pedal position (either directly or via the common bus 78 from the primary and/or secondary wheel control circuits), and detect weight-on-wheels (WOW) to determine appropriate control of the shutoff valves 46 and 48. The primary interface control circuit 76 operates the shutoff valve 48 for the hydraulic system B. The secondary interface control circuit 72 operates the shutoff valve 46 for the hydraulic system A.

The WOW, pedal position and wheel speed are also available to the primary wheel control circuit 70 and the secondary wheel control circuit 74 (either directly or via the common bus 78 from the interface control circuits). For redundancy, the secondary wheel control circuit 74 also operates the hydraulic system A shutoff valve 46 in parallel with the secondary interface control circuit 72 operation. Likewise, the primary wheel control circuit 70 operates the hydraulic system B shutoff valve 48 in parallel with the primary interface control circuit 76 operation. However, the primary wheel control circuit 70 and secondary wheel control circuit 74 are designed to have a longer hold-off period, allowing the primary interface control circuit 76 and secondary interface control circuit 72 to perform the shutoff valve function during non-failure or normal operating conditions.

The primary interface control circuit 76 and secondary interface control circuit 72 operation of the shutoff valves 46 and 48, in conjunction with the primary wheel control circuit 70 and secondary wheel control circuit 74 operation of the metering valves 50, 52, 54 and 56, prevents uncommanded braking from a single point failure.

iii. Parking Brake Operation

Continuing to refer to FIG. 2, the system 10 further includes a parking brake valve 80 (also shown in FIG. 1). The system 10 performs a parking brake function by both the primary interface control circuit 76 and the secondary interface control circuit 78 activating the parking brake valve 80, located on the hydraulic system A return. The parking brake valve 80 is configured such that a 28 volt signal from at least one of the primary interface control circuit 76 and the secondary interface control circuit 78, and a ground signal from at least one of the primary wheel control circuit 70 and secondary wheel control circuit 74 are necessary in order to perform a parking brake function. This prevents uncommanded parking brake operation from a single point failure and allows parking brake operation with a single failure.

iv. Failure of Input to Primary Wheel Control Circuit

The primary wheel control circuit 70 is configured such that if it detects a failure of any of its inputs, the primary wheel control circuit 70 sends a message to the secondary wheel control circuit 74 via the common bus 78 to perform the anti-skid and brake control functions. The secondary wheel control circuit 74 collects wheel speed, torque, hydraulic pressure and pedal positions from a set of corresponding secondary sensors. The secondary wheel control circuit 74 then performs the anti-skid algorithm, executes the torque loop control, computes the brake pressure to be applied, and controls the hydraulic system B metering valves 54 and 56. At substantially the same time, the secondary wheel control circuit 74 sends a message to the primary wheel control circuit 70 to command the desired brake pressure to be applied in the metering valves 50 and 52 of the hydraulic system A. The primary wheel control circuit 70 in turn controls the metering valves 50 and 52 to provide the desired brake pressure to the wheels 36.

In this manner, the system 10 is able to operate with 100% of its actuators even in the case of an input failure to the primary wheel control circuit 70. Moreover, it will be appreciated that in the event of a failure of an input to the secondary wheel control circuit 74 the reverse of the above operation may be performed with the same result.

V. Total Failure of Primary Wheel Control Circuit

If the primary wheel control circuit 70 experiences a total failure, it is configured to either notify the secondary wheel control circuit 74 (if possible) or stop communications with the secondary wheel control circuit 74 via the common bus 78. In the event of such a total failure, the secondary wheel control circuit 74 learns of the failure either by being notified by the primary wheel control circuit 70 or by detecting a termination in communications from the primary wheel control circuit 74. The secondary wheel control circuit 74 proceeds to collect wheel speed, torque, hydraulic pressure and pedal positions from the secondary sensors. The secondary wheel control circuit 74 then performs the anti-skid algorithm, executes the torque loop control, computes the brake pressure applied, and controls the hydraulic system B metering valves 54 and 56 to provide braking. In this case, the system 10 operates with 50% of its brake actuators.

The primary wheel control circuit 70 and secondary wheel control circuit 74 are configured such that when the secondary wheel control circuit 74 detects a failure of the primary wheel control circuit (e.g., by detecting a stop in communication or receiving notification), the secondary wheel control circuit 74 transmits a message via the common bus 78 indicating that it has taken over as the primary system. If the primary wheel control circuit 70 has not failed and disagrees with the secondary wheel control circuit 74, the primary wheel control circuit continues operation of the hydraulic system A metering valves 50 and 52. In addition, the primary wheel control circuit 70 sends a message via the common bus 78 indicating that anti-skid control has failed. In this failure situation, manual braking mode is entered. Shutoff valve operation by the primary and secondary interface control circuits 76 and 72 prevents uncommanded braking.

Figure 5:
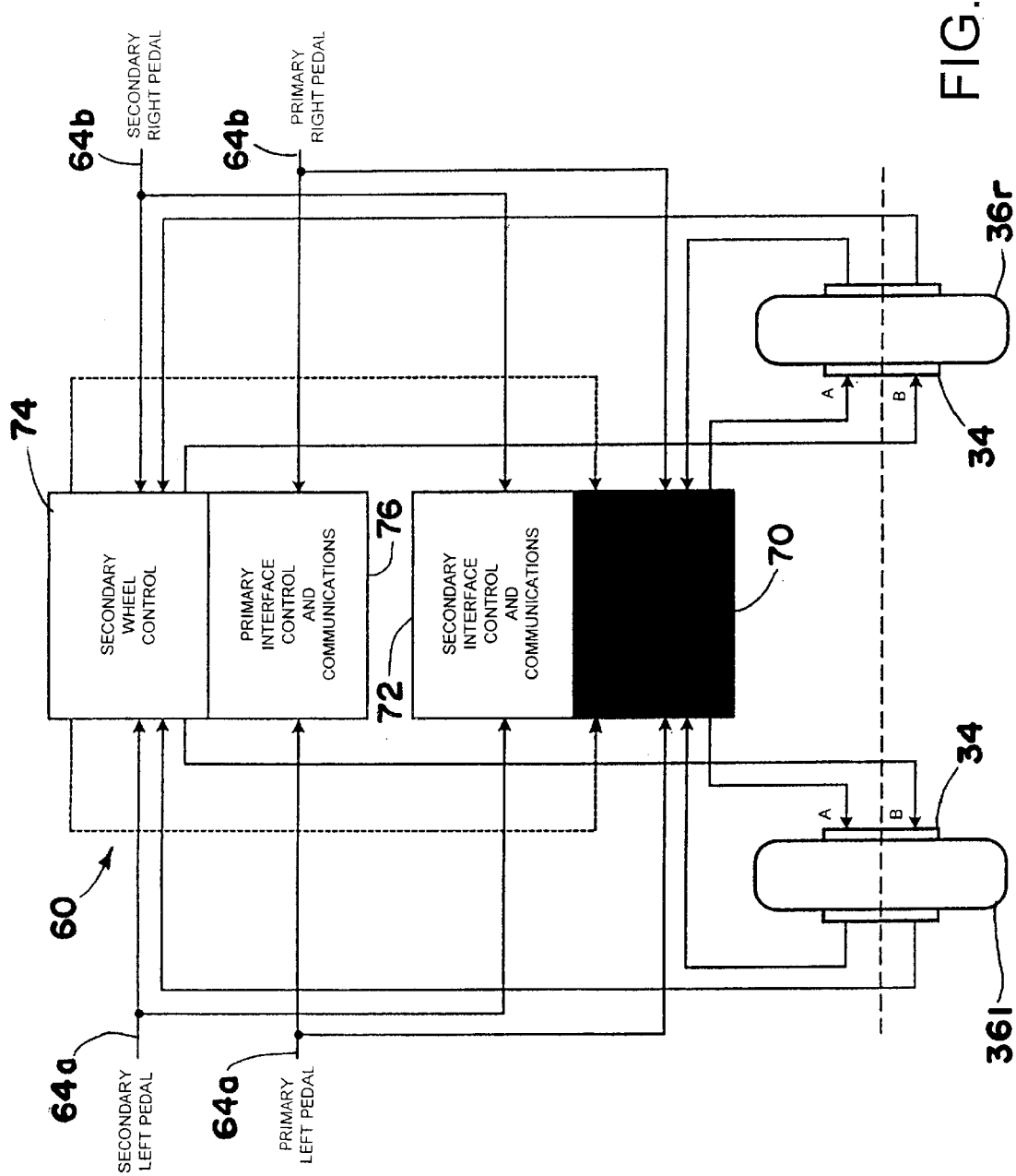
FIG. 5 represents signal flow within the system of FIGS. 1 and 2 in the event of a failed primary processor.

FIG. 5 represents signal flow in the event of a total failure of the primary wheel control circuit 70. Again, it will be appreciated that the primary and secondary wheel control circuits may be configured to operate inversely in the even of a total failure of the secondary wheel control circuit 74.

vi. Total Failure of a Circuit Card

In the event of a total circuit card failure (i.e., either the primary wheel control/secondary interface control circuit card or the secondary wheel control/primary interface control circuit card), the system 10 will operate with 50% of the actuators. Such an event is highly unlikely to occur.

It will be appreciated that the above features of the system 10 may be extended to four wheels and to electromechanical, pneumatic or other type braking systems. The invention need not be limited to hydraulic brake systems. Nor does the invention need to be limited to aircraft. It will be appreciated that the present invention may be applied in virtually any type of brake system and in connection with any type of vehicle.

The redundant hydraulic systems A and B are formed preferably so as to rely on separate power sources (e.g., separate power busses, different engines on the aircraft, etc.). Thus, if one system fails the other system is likely still available.

Although the invention has been shown and described with respect to certain preferred embodiments, it is obvious that equivalents and modifications will occur to others skilled in the art upon the reading and understanding of the specification. For example, although the system is described with redundancy of a BSCU primary and secondary, four valves, two power sources, etc., this is for example sake only. Additional numbers of redundancy are within the intended scope of the invention. The present invention includes all such equivalents and modifications, and is limited only by the scope of the following claims.

What is claimed is:

1. A redundant brake control and anti-skid system for providing braking to a vehicle, comprising:
   a primary brake control assembly comprising a primary wheel control circuit for performing brake control and anti-skid functions and outputting electrical control signals relating thereto, and a primary interface control circuit for interfacing with the vehicle and providing emergency shutoff function;
   a secondary brake control assembly separate from the primary brake control assembly and comprising a secondary wheel control circuit for performing brake control and anti-skid functions and outputting electrical control signals relating thereto, and a secondary interface control circuit for interfacing with the vehicle and providing emergency shutoff function;
   a bus for enabling electrical communications between the primary brake control assembly and the secondary brake control assembly; and
   at least one brake actuator controlled by the electrical control signals from the primary brake control assembly and at least one other brake actuator controlled by the electrical control signals from the secondary brake control assembly for providing braking force to wheels of the vehicle.

2. The system of claim 1, wherein during normal operation the primary brake control assembly performs an anti-skid algorithm and computes the braking force to be applied to the wheels of the vehicle, and the primary brake control assembly sends a message to the secondary brake control assembly via the bus indicative of the braking force to be applied.

3. The system of claim 2, wherein if the primary brake control assembly detects a failure of an input the primary brake control assembly, the primary brake control assembly sends a message to the secondary brake control assembly via the bus prompting the secondary brake control assembly to perform the anti-skid algorithm and compute the braking force to be applied to the wheels of the vehicle.

4. The system of claim 3, wherein the secondary brake control sends a message back to the primary brake control assembly indicating the braking force to be applied.

5. The system of claim 2, wherein if the primary brake control assembly fails the primary brake control assembly at least one of notifies the secondary brake control assembly or stops communications with the secondary brake control assembly via the bus, which in turn is detected by the secondary brake control assembly.

6. The system of claim 5, wherein the secondary brake control assembly performs the anti-skid algorithm and computes the braking force to be applied to the wheels of the vehicle.

7. The system of claim 1, wherein the primary wheel control circuit and the secondary wheel control circuit are formed on separate circuit card assemblies.

8. The system of claim 1, wherein the primary interface control circuit and the secondary interface control circuit are formed on separate circuit card assemblies.

9. The system of claim 1, wherein the primary wheel control circuit and the secondary interface control circuit are formed on a first circuit card assembly and the secondary wheel control circuit and the primary interface control circuit are formed on a second circuit card assembly different from the first circuit card assembly.

10. The system of claim 1, further comprising an emergency shutoff mechanism, and wherein the primary brake control assembly and the secondary brake control assembly are configured to activate the emergency shutoff mechanism.

11. The system of claim 1, further comprising a first hydraulic system controlled by the primary brake control assembly and a second hydraulic system controlled by the secondary brake control assembly.

12. The system of claim 11, wherein the primary brake control assembly controls an emergency shutoff mechanism included in the second hydraulic system and the secondary brake control assembly controls an emergency shutoff mechanism included in the first hydraulic system.

13. A redundant brake control and anti-skid system for providing braking to a vehicle, comprising:
   a primary brake control assembly for performing brake control and anti-skid functions and outputting electrical control signals relating thereto;
   a secondary brake control assembly separate from the primary brake control assembly for performing brake control and anti-skid functions and outputting electrical control signals relating thereto;
   a bus for enabling electrical communications between the primary brake control assembly and the secondary brake control assembly; and at least one brake actuator controlled by the electrical control signals from the primary brake control assembly and at least one other brake actuator controlled by the electrical control signals from the secondary brake control assembly for providing braking force to wheels of the vehicle.

* * * * *